United States Patent
Aggarwal

(10) Patent No.: US 7,602,702 B1
(45) Date of Patent: Oct. 13, 2009

(54) FAST REROUTE OF TRAFFIC ASSOCIATED WITH A POINT TO MULTI-POINT NETWORK TUNNEL

(75) Inventor: Rahul Aggarwal, San Francisco, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 374 days.

(21) Appl. No.: 11/056,383

(22) Filed: Feb. 10, 2005

(51) Int. Cl.
- G01R 31/08 (2006.01)
- H04H 20/71 (2008.01)
- H04L 12/28 (2006.01)
- H04J 3/26 (2006.01)
- G06F 15/173 (2006.01)

(52) U.S. Cl. ............... 370/217; 370/221; 370/312; 370/390; 370/392; 370/432; 709/239

(58) Field of Classification Search ........... 370/217, 370/221
See application file for complete search history.

(56) References Cited

U.S. PATENT DOCUMENTS

| | | | |
|---|---|---|---|
| 5,600,642 | A | 2/1997 | Pauwels et al. |
| 6,374,303 | B1 | 4/2002 | Armitage et al. |
| 6,477,166 | B1 | 11/2002 | Sanzi et al. |
| 6,493,349 | B1 | 12/2002 | Casey |
| 6,501,754 | B1 | 12/2002 | Ohba et al. |
| 6,553,028 | B1 | 4/2003 | Tang et al. |
| 6,731,652 | B2 | 5/2004 | Ramfelt et al. |
| 6,751,218 | B1 | 6/2004 | Hagirahim et al. |
| 6,778,531 | B1 | 8/2004 | Kodialam et al. |
| 6,807,182 | B1 | 10/2004 | Dolphin et al. |
| 6,879,594 | B1 | 4/2005 | Lee et al. |
| 6,920,503 | B1 | 7/2005 | Nanji et al. |
| 7,035,226 | B2 | 4/2006 | Enoki et al. |
| 7,039,687 | B1 | 5/2006 | Jamieson et al. |

(Continued)

FOREIGN PATENT DOCUMENTS

JP   2005130258 A   5/2005

(Continued)

OTHER PUBLICATIONS

Aggarwal et al, "Establishing point to multipoint MPLS TE LSPs", IETF, Jan. 2004, pp. 1-15.*

(Continued)

Primary Examiner—Pankaj Kumar
Assistant Examiner—Hicham B Foud
(74) Attorney, Agent, or Firm—Shumaker & Sieffert, P.A.

(57) ABSTRACT

Techniques are described for fast reroute of traffic associated with a point to multi-point (P2MP) tunnel. A system may, for example, include a source network device and a plurality of destination network devices. The system further includes a label switched path (LSP) tunnel from the source network device to the plurality of destination network devices. The LSP tunnel includes a plurality of branch LSPs and may include one or more bypass tunnel associated with one or more of the branch LSPs. In other configurations, the system may include a second LSP tunnel from the source network device to the plurality of destination network devices. The second LSP tunnel includes a plurality of detour branch LSPs, and each of the detour branch LSPs corresponds to a respective one of the branch LSPs for the first P2MP LSP tunnel.

12 Claims, 8 Drawing Sheets

U.S. PATENT DOCUMENTS

| | | | |
|---|---|---|---|
| 7,082,102 B1 | 7/2006 | Wright | |
| 7,133,928 B2 | 11/2006 | McCanne | |
| 7,251,218 B2 | 7/2007 | Jorgensen | |
| 7,269,135 B2* | 9/2007 | Frick et al. | 370/228 |
| 7,281,058 B1 | 10/2007 | Shepherd et al. | |
| 7,330,468 B1 | 2/2008 | Tse-Au | |
| 7,333,491 B2 | 2/2008 | Chen et al. | |
| 7,359,328 B1 | 4/2008 | Allan | |
| 7,360,084 B1 | 4/2008 | Hardjono | |
| 7,366,894 B1 | 4/2008 | Kalimuthu et al. | |
| 7,418,003 B1 | 8/2008 | Alvarez et al. | |
| 7,463,591 B1 | 12/2008 | Kompella et al. | |
| 7,477,642 B2* | 1/2009 | Aggarwal et al. | 370/390 |
| 7,483,439 B2 | 1/2009 | Shepherd et al. | |
| 7,545,735 B1* | 6/2009 | Shabtay et al. | 370/217 |
| 2002/0071390 A1 | 6/2002 | Reeves et al. | |
| 2002/0118644 A1 | 8/2002 | Moir | |
| 2002/0181477 A1 | 12/2002 | Mo et al. | |
| 2002/0186664 A1 | 12/2002 | Gibson et al. | |
| 2002/0191584 A1 | 12/2002 | Korus et al. | |
| 2003/0021282 A1 | 1/2003 | Hospodor | |
| 2003/0031175 A1 | 2/2003 | Hayashi et al. | |
| 2003/0043772 A1 | 3/2003 | Mathis et al. | |
| 2003/0063591 A1 | 4/2003 | Leung et al. | |
| 2003/0087653 A1 | 5/2003 | Leung et al. | |
| 2003/0088696 A1 | 5/2003 | McCanne | |
| 2003/0099235 A1* | 5/2003 | Shin et al. | 370/390 |
| 2003/0112748 A1* | 6/2003 | Puppa et al. | 370/217 |
| 2003/0123446 A1 | 7/2003 | Muirhead et al. | |
| 2003/0172114 A1 | 9/2003 | Leung | |
| 2003/0177221 A1 | 9/2003 | Ould-Brahim et al. | |
| 2004/0037279 A1 | 2/2004 | Zelig et al. | |
| 2004/0047342 A1 | 3/2004 | Gavish et al. | |
| 2004/0081154 A1 | 4/2004 | Kouvelas | |
| 2004/0151180 A1 | 8/2004 | Hu et al. | |
| 2004/0151181 A1 | 8/2004 | Chu et al. | |
| 2004/0190517 A1 | 9/2004 | Gupta et al. | |
| 2004/0218536 A1 | 11/2004 | Yasukawa et al. | |
| 2005/0018693 A1 | 1/2005 | Dull | |
| 2005/0027782 A1 | 2/2005 | Jalan et al. | |
| 2005/0097203 A1 | 5/2005 | Unbehagen et al. | |
| 2005/0108419 A1 | 5/2005 | Eubanks | |
| 2005/0111351 A1* | 5/2005 | Shen | 370/217 |
| 2005/0169270 A1* | 8/2005 | Mutou et al. | 370/390 |
| 2005/0220132 A1 | 10/2005 | Oman et al. | |
| 2005/0232193 A1 | 10/2005 | Jorgensen | |
| 2005/0262232 A1 | 11/2005 | Cuervo et al. | |
| 2005/0265308 A1 | 12/2005 | Barbir et al. | |
| 2005/0271035 A1 | 12/2005 | Cohen et al. | |
| 2005/0271036 A1 | 12/2005 | Cohen et al. | |
| 2005/0281192 A1* | 12/2005 | Nadeau et al. | 370/217 |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0126496 A1* | 6/2006 | Filsfils et al. | 370/216 |
| 2006/0147204 A1 | 7/2006 | Yasukawa et al. | |
| 2006/0153067 A1* | 7/2006 | Vasseur et al. | 370/217 |
| 2006/0164975 A1* | 7/2006 | Filsfils et al. | 370/225 |
| 2006/0182034 A1 | 8/2006 | Klinker et al. | |
| 2006/0221958 A1 | 10/2006 | Wijnands et al. | |
| 2007/0036162 A1* | 2/2007 | Tingle et al. | 370/392 |
| 2007/0098003 A1 | 5/2007 | Boers et al. | |
| 2007/0124454 A1 | 5/2007 | Watkinson | |
| 2007/0140107 A1 | 6/2007 | Eckert et al. | |
| 2008/0056258 A1 | 3/2008 | Sharma et al. | |
| 2008/0123524 A1* | 5/2008 | Vasseur et al. | 370/228 |
| 2008/0123654 A1 | 5/2008 | Tse-Au | |
| 2008/0291921 A1 | 11/2008 | Du et al. | |
| 2009/0028149 A1 | 1/2009 | Yasukawa et al. | |

FOREIGN PATENT DOCUMENTS

| | | |
|---|---|---|
| JP | 2005167482 A | 6/2005 |
| JP | 2005252385 A | 9/2005 |
| KR | 2004001206 | 1/2004 |
| WO | WO 02/091670 A2 | 11/2002 |
| WO | WO 2004/071032 A1 | 8/2004 |

OTHER PUBLICATIONS

Yasukawa et al, "Requirement for point to multipoint extension to RSVP-TE", IETF, Oct. 2003, pp. 1-20.*

Atlas et al, "MPLS RSVP-TE Interoperability for Local protection/Fast Reroute", IETF, Jul. 2001, pp. 1-14.*

Awduche et al, "RSVP-TE: Extension to RSVP for LSP tunnels", IETF, Dec. 2001, pp. 1-57.*

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

U.S. Appl. No. 10/860,183, entitled "Constraint-Based Label Switched Path Selection Within A Computer Network," filed Jun. 3, 2004.

U.S. Appl. No. 10/928,572, entitled "Traffic Engineering Using Extended Bandwidth Accounting Information," filed Aug. 27, 2004.

U.S. Appl. No. 10/973,677, entitled "RSVP-Passive Interfaces For Traffic Engineering Peering Links In MPLS Networks," filed Oct. 26, 2004.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

U.S. Appl. No. 11/215,813, entitled "Point to Multi-Point Label Switched Paths With Label Distribution Protocol," filed Aug. 29, 2005, 25 pgs.

U.S. Appl. No. 11/192,432, entitled "Transmission of Layer Two (L2) Multicast Traffic Over Multi-Protocol Label Switching Networks," filed Jul. 28, 2005, 24 pgs.

U.S. Appl. No. 11/212,509, entitled "Aggregate Multicast Trees For Multicast Virtual Private Networks," filed Aug. 26, 2005.

U.S. Appl. No. 11/212,500, entitled "Multicast Data Trees For Multicast Virtual Private Networks," filed Aug. 26, 2005.

U.S. Appl. No. 11/212,507, entitled "Reliable Exchange Of Control Information For Multicast Virtual Private Networks," filed Aug. 26, 2005.

U.S. Appl. No. 11/213,636, entitled "Transport Of Control And Data Traffic For Multicast Virtual Private Networks," filed Aug. 26, 2005.

U.S. Appl. No. 11/213,638, entitled "Shared Multicast Trees For Multicast Virtual Private Networks," filed Aug. 26, 2005.

U.S. Appl. No. 11/212,475, entitled "Label Switching Multicast Trees For Multicast Virtual Private Networks," filed Aug. 26, 2005.

U.S. Appl. No. 11/212,932, entitled "Multicast Trees For Virtual Private Local Area Network (LAN) Service Multicast," filed Aug. 26, 2005.

U.S. Appl. No. 11/213,637, entitled "Aggregate Multicast Trees For Virtual Private Local Area Network (LAN) Service Multicast," filed Aug. 26, 2005.

U.S. Appl. No. 11/212,490, entitled "Multicast Data Trees For Virtual Private Local Area Network (LAN) Service Multicast," filed Aug. 26, 2005.

U.S. Appl. No. 11/213,639, entitled "Exchange Of Control Information For Virtual Private Local Area Network (LAN) Service Multicast," filed Aug. 26, 2005.

U.S. Appl. No. 11/213,640, entitled "Auto-Discovery Of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

Aggarwal et al., "MPLS Upstream Label Assignment and Context Specific Label Space," Network Working Group Internet Draft, draft-raggarwa-mpls-upstream-label-00.txt, Jan. 2005, 9 pgs.

Wijnands et al., "Multicast Extensions for LDP," Network Working Group Internet Draft, draft-wijnands-mpls-ldp-mcast-ext-00.txt, Mar. 2005, 13 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

* cited by examiner

FAST REROUTE OF TRAFFIC ASSOCIATED WITH A POINT TO MULTI-POINT NETWORK TUNNEL

TECHNICAL FIELD

The invention relates to computer networks and, more particularly, to engineering traffic flows within computer network.

BACKGROUND

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link, including peering links, may approach a maximum bandwidth capacity for the link, thereby leading to congestion and loss.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System—Intermediate System (ISIS) protocol or the Open Shortest Path First (OSPF) protocol.

RSVP-TE defines mechanisms for setting up point to point (P2P) TE tunnels. Conventional mechanisms have not been defined for building point to multipoint (P2MP) TE tunnels.

SUMMARY

In general, the invention is directed to techniques for fast reroute of traffic associated with a point to multi-point (P2MP) tunnel. For example, techniques are describes for establishing a P2MP tunnel from a source to a plurality of destinations. In one described embodiment, the techniques utilize semantics of RSVP that RSVP-TE inherits to create a P2MP TE tree within a computer network. In particular, the extensions may be used to setup P2P TE "branch LSPs" between source and receiver provider edge routers. The P2P TE LSPs are merged by the network using RSVP semantics to result in a P2MP TE LSP. Techniques are described for addressing network events, such as link or node failures, to reroute traffic through bypass or detour tunnels associated with the P2MP TE LSP.

In one embodiment, a method comprises establishing a P2MP LSP tunnel having a source and multiple destinations, wherein the P2MP LSP tunnel has a plurality of branch LSPs. The method further comprises establishing the P2MP LSP tunnel to include a bypass tunnel associated with at least one of the branch LSPs.

In another embodiment, a method comprises establishing a P2MP LSP tunnel having a source and multiple destinations, wherein the LSP tunnel a plurality of branch LSPs. The method further comprises establishing a second P2MP LSP tunnel from the source to the multiple destinations, wherein the second P2MP LSP tunnel comprises a plurality of detour branch LSPs, and each of the detour branch LSPs corresponds to a respective one of the branch LSPs for the first P2MP LSP tunnel.

In another embodiment, a system comprises a source network device and a plurality of destination network devices. The system further includes a LSP tunnel from the source network device to the plurality of destination network devices. The LSP tunnel has at least two branch LSPs and includes a bypass tunnel associated with at least one of the branch LSPs.

In another embodiment, a system comprises a source network device and a plurality of destination network devices. The system further includes a first LSP tunnel from the source network device to the plurality of destination network devices, wherein the LSP tunnel a plurality of branch LSPs. The system further includes a second LSP tunnel from the source network device to the plurality of destination network devices, wherein the second LSP tunnel comprises a plurality of detour branch LSPs, and each of the detour branch LSP corresponds to a respective one of the branch LSPs for the first P2MP LSP tunnel.

In another embodiment, a computer-readable medium comprises instructions that cause a processor to establishing a branch LSP that forms a part of a point to multi-point (P2MP) label switched path (LSP) tunnel having a source and multiple destinations. The instructions further cause the processor to establish a bypass tunnel associated with the branch LSPs.

The details of one or more embodiments of the invention are set forth in the accompanying drawings and the description below. Other features, objects, and advantages of the invention will be apparent from the description and drawings, and from the claims.

DETAILED DESCRIPTION

In general, this disclosure describes techniques for point to multipoint (P2MP) Traffic Engineering (TE). It is recognized herein that RSVP-TE is built on RSVP which does have mechanisms for supporting multiple receivers for the same session. Techniques are described herein for extending RSVP-TE to allow RSVP-TE to be used for establishing P2MP TE tunnels. In general, the techniques rely on semantics of RSVP that RSVP-TE inherits and utilize the semantics to create a P2MP TE tree within a computer network. In particular, the extensions may be used to setup P2P TE LSPs between source and receiver provider edge routers.

As described herein, the P2P TE LSPs are appropriately merged by the network using RSVP semantics to result in a P2MP TE LSP. The P2P LSPs may be initiated using RSVP-TE by the provider edge router attached to the source. The routers may utilize MPLS label forwarding information that is enhanced to support multicast of MPLS packets at nodes where the P2P LSPs merge. Further details on these techniques are described in Rahul Aggarwal et al., Establishing Point to Multipoint MPLS TE LSPs," Network Working Group, Internet Engineering Task Force (IETF), August 2004, hereby incorporated by reference.

One objective of the techniques is to optimize packet replication and minimize state and intelligence in the core of the network, while performing P2MP TE. As a result of the P2MP TE LSPs, routing devices within the network core need not run a multicast routing protocol to support multicast traffic. There can be various applications for P2MP TE LSPs described herein, and multicast is but one example.

Figure 1:
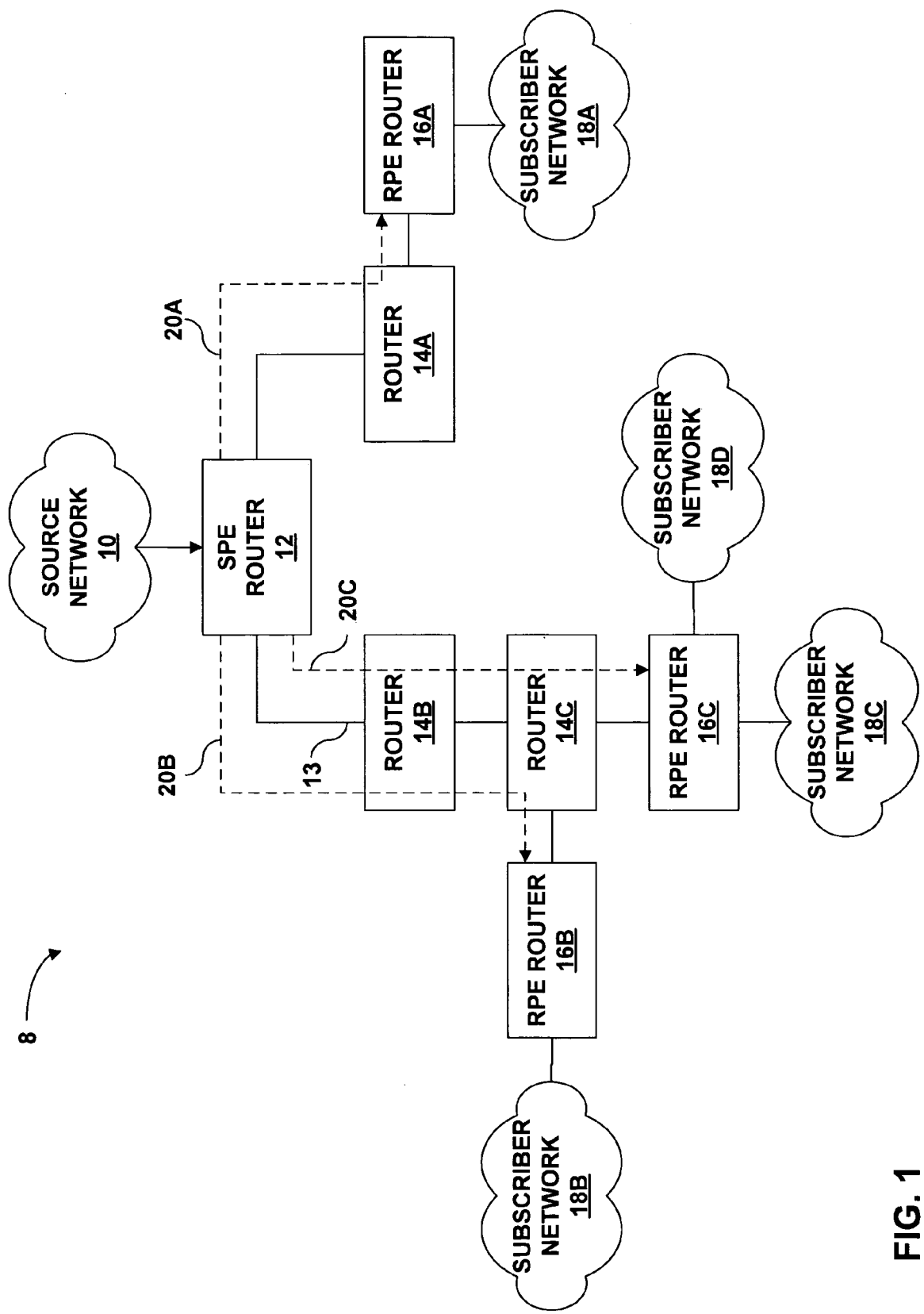
FIG. 1 is a block diagram illustrating an exemplary computer network having a point to multi-point (P2MP) label switch path (LSP).

FIG. 1 is a block diagram illustrating an exemplary computer network 8. Computer network 8 utilizes a protocol that has been extended to allow fast reroute of a P2MP LSP established as described above. The fast reroute techniques described herein set up a bypass tunnel around a failed component within the P2MP LSP in order to maintain the flow of traffic between a source network 10 and subscriber networks 18A-18B ("subscriber networks 18"). Applying a single bypass tunnel to the P2MP LSP may protect several P2P LSPs within the P2MP LSP.

In the example of FIG. 1, a source provider edge (SPE) router 12 (also referred to as a source network device) uses RSVP-TE to establish P2P LSPs to carry traffic between source network 10 and subscriber networks 18. A P2P LSP 20A is established between SPE router 12 of source network 10 and a receiver provider edge (RPE) router 16A (destination network device) of subscriber network 18A. A P2P LSP 20B is also established between SPE router 12 and a RPE router 16B of subscriber network 18B, and a P2P TE LSP 20C is established between SPE router 12 and RPE router 16C of subscriber network 18C. Each of the P2P LSPs are built between SPE router 12 and one of RPE routers 16 over one or more routers 14.

The RSVP-TE extensions described above merge the established P2P LSPs 20A-20C to create P2MP TE LSP 20. P2MP LSP 20 may be set up such that each of RPE routers 16 is free to choose a desired Quality of Service (QoS) level. Furthermore, P2MP LSP 20 is mapped to SPE router 12 and a unique identifier for P2MP LSP 20 (referred to as a PID). In this manner, SPE router 12 maintains the flexibility to setup multiple P2P LSPs for the same PID.

P2MP LSP 20 is setup by merging the individual P2P LSPs and relying on MPLS label multicast. The P2P LSPs that are merged to form the P2MP LSPs are referred to as branch LSPs. The branch LSPs are initiated by SPE router 12. Hence the solution is as efficient as trees setup by a multicast routing protocol in an Internet Protocol (IP) environment. However, this is achieved without burdening RSVP-TE with any of the mechanisms of a multicast routing protocol.

Source network 10 may comprise any public or private network or the Internet. As shown in FIG. 1, computer network 8 includes subscriber networks 18. Subscriber networks 18 may include local area networks (LANs) or wide area networks (WANs) that comprise a plurality of subscriber devices. The subscriber devices may include personal computers, laptops, workstations, personal digital assistants (PDAs), wireless devices, network-ready appliances, file servers, print servers or other devices that access source network 10 via SPE router 12. In some cases, the subscriber devices request multicast streams, such as IPTV channels, from source network 10. P2MP LSP 20 established between source network 10 and subscriber devices 18 enables transmission of multicast traffic without run a multicast routing protocol on routers 12, 14, and 16.

SPE router 12, routers 14, and RPE routers 16 maintain routing information that describes available routes through computer network 8. Upon receiving an incoming packet, the routers examine information within the packet and forward the packet in accordance with the routing information. In order to maintain an accurate representation of network 8, the routers exchange routing information, e.g., bandwidth availability of links, in accordance with a defined routing protocol, such as an Interior Gateway Protocol (IGP).

The extended protocol described herein performs fast reroute of P2MP TE LSP 20 in the event of either a link or a node failure. For example, in the case where router 14B fails, the fast reroute techniques may utilize a bypass tunnel (not shown in FIG. 1) between SPE router 12 and router 14C. As another example, in the case where a link 13 fails, the fast reroute techniques may build a bypass tunnel (not shown) between SPE router 12 and router 14B. In either example, the bypass tunnel enables protection of both branch LSPs 20B and 20C.

Figure 2:
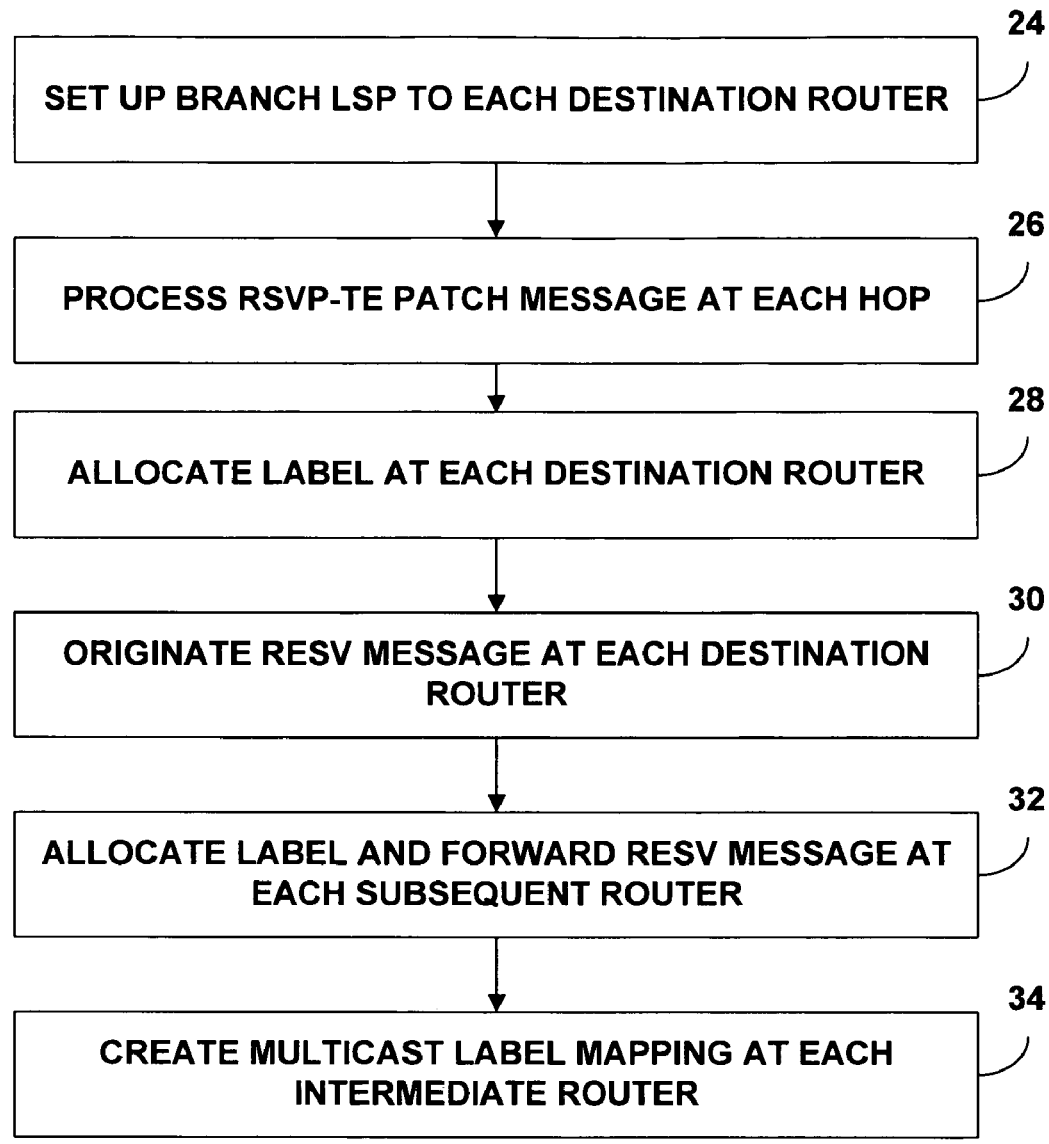
FIG. 2 is a flowchart illustrating exemplary operation of the computer network in establishing the P2MP LSP.

FIG. 2 is a flowchart illustrating example operation of a router in establishing a P2MP LSP within a computer network. The operation is described in reference to computer network 8 of FIG. 1. In this illustrated example, SPE router 12 is aware of RPE routers 16 interested in a given PID of P2MP LSP 20. For instance, the PID may comprise a multicast group that RPE routers 16 are interested in joining. The flowchart of FIG. 2 illustrates exemplary procedures followed by SPE router 12 to setup P2MP LSP 20 mapped to the particular PID.

Initially, SPE router 12 establishes a RSVP-TE branch LSP (i.e., a P2P LSP) to each of receiving routers 16 that will be a destination for P2MP LSP 20 (24). In particular, source router 12 outputs a set of PATH messages to established the branch LSPs that will be merged to form P2MP LSP 20. Each branch LSP is associated with the same P2MP LSP 20. Hence, each branch LSP can be "merged" with the other branch LSPs to form P2MP LSP 20. As described below in reference to FIG. 3, a new P2MP session object is introduced for this purpose.

When establishing the branch LSPs, each branch LSP is signaled with shared semantics. Hence another branch LSP belonging to the same session can share resources with this LSP. The session is determined based on the new RSVP-TE P2MP session object described below. Each branch LSP is identified using a new P2MP sender template, also described in further detail below. The PATH message for each branch LSP carries an explicit route object. Each one of intermediate routers 14 is able to processes the RSVP-TE PATH message in accordance with conventional RSVP-TE procedures (26).

Next, each RPE router 16 allocates an LSP label in response to the PATH message (28) and outputs a RESV message in response (30). Advantageously, each RPE router 16 may follow normal RSVP procedures while originating a RESV message. For example, each RPE router 16 can indicate a different QoS level in the RESV message from a QoS level specified in the PATH message as long as the new QoS level is lower. The RESV messages originated by the RPE routers 16 carry the labels allocated by the destination routers.

Intermediate routers 14 receive the RESV messages, allocate their own labels and pass the allocated labels in the RESV messages to the originating one of RPE routers 16 (32). Each of the RESV messages, for a given session, received from downstream routers that use the same interface to reach the upstream next hop are allocated the same label. This label may, therefore, be viewed as a "multicast label" in the example where the P2MP LSP is used to carry multicast traffic. This multicast label is associated by that node with all the labels received from downstream RESV messages for a given session. In other words, each node creates a multicast label mapping to associate the label with all the labels received from downstream RESV messages for that session (34). In this manner, P2MP LSP 20 may be established by merging branch LSP from SPE router 12 to the RPE routers 16.

Figure 3:
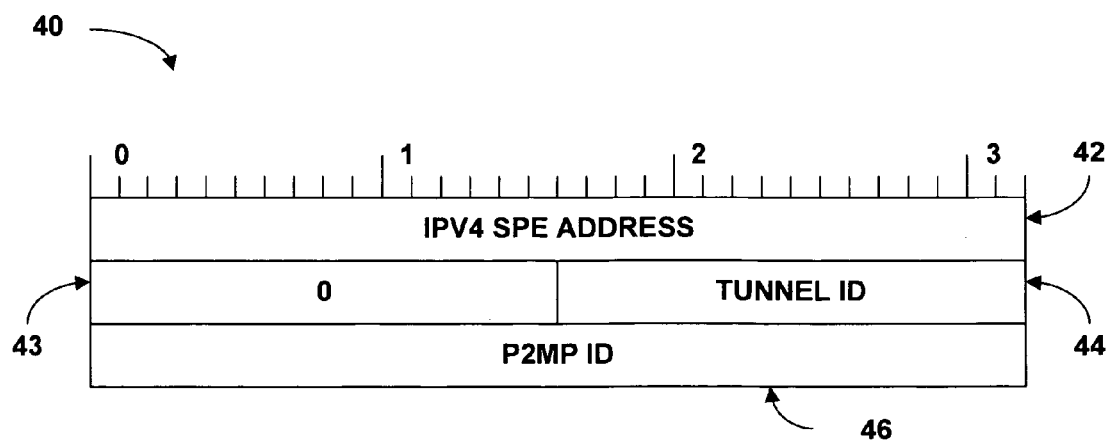
FIG. 3 is a block diagram illustrating an exemplary new Resource Reservation Protocol with Traffic Engineering extensions (RSVP-TE) session object for use in establishing a point to multi-point (P2MP) label switch path (LSP).

FIG. 3 is a block diagram illustrating an exemplary new RSVP-TE session object 40 for use in establishing a P2MP LSP. It may be possible to simply use a conventional RSVP-TE session object and indicate a P2MP LSP using session attributes. However, it is conceptually simpler and easier for an implementation to associate the semantics for P2MP MPLS with session object 40. Session object 40 has a similar structure as the conventional P2P RSVP-TE session object. All branch LSPs of the P2MP LSP share the same session object.

In this example, session object 40 includes an IPv4 source router address 42, a field 43 set to zero, a tunnel ID 44, and a P2MP ID 46. IPv4 source router address 42 comprises the IPv4 address of a source router, such as SPE router 12 (FIG. 1). An implementation may use the source router ID as address 42. The corresponding field in the conventional P2P RSVP-TE session object is the destination router address of the session. The destination router address of a P2MP branch LSP will be determined from a sender template described below.

Tunnel ID 44 comprises a 16-bit identifier used in the session that remains constant over the life of the tunnel. P2MP ID 46 comprises a 32-bit identifier used in the session that remains constant over the life of the tunnel. P2MP ID 46 encodes the PID associated with the P2MP LSP. In other embodiments, session object 40 may comprise an IPv6 source router address instead of IPv4 source router address 42 as illustrated in FIG. 3.

Figure 4:
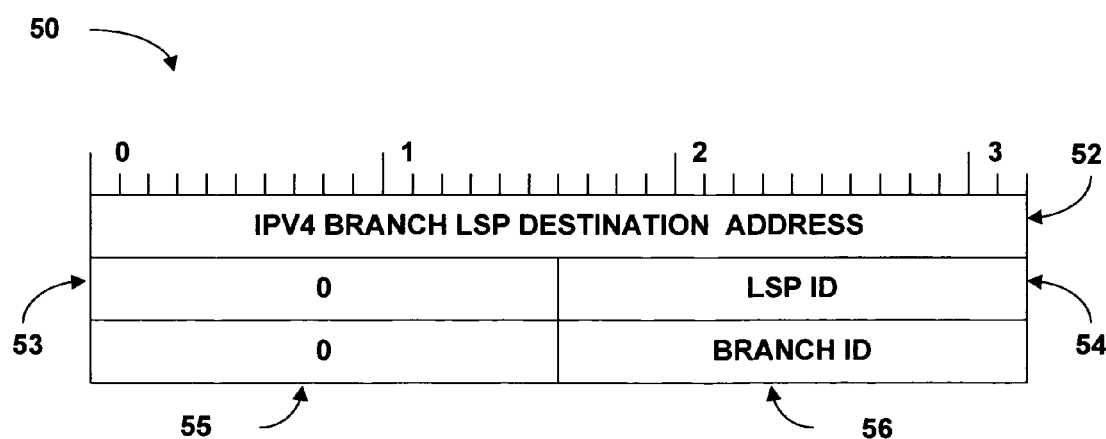
FIG. 4 is a block diagram illustrating an exemplary P2MP branch LSP sender template object.

FIG. 4 is a block diagram illustrating an exemplary P2MP branch LSP sender template object 50. Sender template 50 identifies a particular branch LSP belonging to a P2MP LSP. Sender template 50 includes an IPv4 branch LSP destination address 52, an LSP ID 54, a branch ID 56, and two fields 53, 55 set to zero. Branch LSP destination address 52 comprises an IPv4 address of the destination router of the particular branch LSP. In other embodiments, sender template 50 may comprise an IPv6 branch LSP destination address instead of IPv4 branch LSP destination address 52 as illustrated in FIG. 4.

LSP ID 54 comprises a 16-bit identifier that can be changed to allow a sender to share resources with itself. Thus multiple instances of the P2MP tunnel can be created, each with a different LSP ID. The instances can share resources with each other, but use different labels. The branch LSPs corresponding to a particular instance use the same LSP ID. Branch ID 56 comprises a 16-bit identifier that identifies a particular branch LSP. Different branch LSPs with the same LSP ID follow the label merge semantics described above to form a particular instance of the P2MP tunnel.

Figure 5:
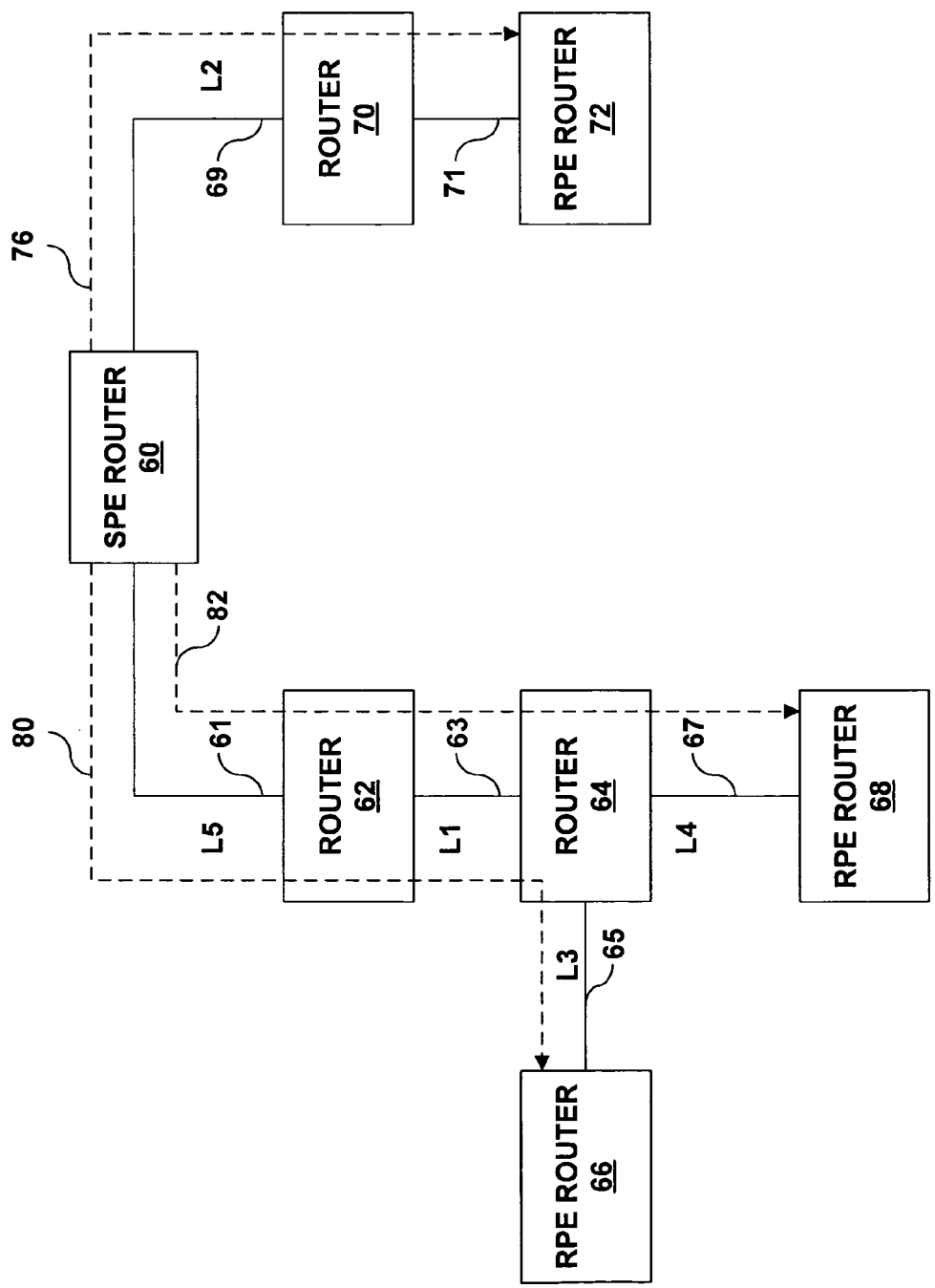
FIG. 5 is a block diagram illustrating a portion of the computer network of FIG. 1 in further detail.

FIG. 5 is a block diagram illustrating an exemplary computer network 58 in which P2MP RSVP TE tunnels have been established. Computer network 58 includes a SPE router 60, a RPE router 66, a RPE router 68 and a RPE router 72. Computer network 58 also includes intermediate routers 62, 64, 68, and 70. SPE router 12 establishes a P2MP LSP between SPE router 12 and RPE routers 66, 68, and 72.

SPE router 60 first learns that RPE routers 66, 68, and 60 are interested in joining a P2MP LSP associated with a particular PID. For example, the PID may be a multicast group. SPE router 60 may learn of RPE routers 66, 68, and 72 at different points, though in this example it is assumed that SPE router 60 learns of the RPE routers at the same time. SPE router 12 then computes the P2P paths to reach RPE router 66, RPE router 68, and RPE router 72. These branch LSPs are computed to share the same links where possible as they belong to the same session.

For example, SPE router 60 establishes branch LSP 76 to RPE router 72 via router 70. SPE router 60 also establishes branch LSPs 80 and 82 with RPE routers 66 and 68, respectively, via router 62 and router 64. As shown in FIG. 5, Branch LSPs 80 and 82 share links 63 and 61 between router 64 and SPE router 60.

SPE router 60 sends a PATH message for each branch LSP. RPE routers 66, 68, and 72 respond with RESV messages. Router 64 receives a RESV message from RPE router 66 with label L3 and from RPE router 68 with label L4. Router 64 then allocates a label L1 and sends the RESV messages to router 62. Router 64 also creates a multicast label mapping of (L1→{L3, L4}). Router 62 allocates a label L5 and sends the RESV messages to SPE router 60, each with label L5. Router 62 creates a label mapping of {L5→L1}. SPE router 60 also receives a RESV from router 70 with a label of L2.

A sender on a LAN typically uses a different label for sending a packet to each node on the LAN that belongs to the P2MP LSP. Thus the sender performs packet replication. However, it may be desirable to avoid packet replication on a LAN by using the same label for sending a packet to multiple nodes belonging to the same P2MP LSP. Given the relatively small number of LANs in MPLS networks, using the different labels for each transmission of the same packet is not a practical problem. Furthermore, avoiding packet replication at the sender on a LAN requires significant complexity in the control plane.

As mentioned earlier, the extended RSVP-TE merges individual branch LSPs to form a P2MP LSP. A separate PATH message, with an explicit route object, is sent for each branch LSP. Hence RSVP-TE is not burdened with P2MP explicit routes. This has the advantage of keeping RSVP-TE procedures as close as possible to conventional TE procedures for P2P LSPs. This reduces complexity and makes it easier to enhance conventional and deployed RSVP-TE implementations to support P2MP TE LSPs. RSVP refresh reduction can be used to reduce the signaling overhead.

Non-adjacent signaling, described in more detail below, can be used to reduce PATH message processing and state on nodes that are along the common path of two or more branch LSPs. It is also described below how LSP hierarchy can be used to reduce P2MP control plane processing on transit label switch routers (LSRs).

As described above, a separate PATH message is processed for a branch LSP by each node along the explicit route of the branch LSP. This is indeed true for the first branch LSP to be setup along a given explicit route. The next branch LSP may follow the same path as the first branch LSP up to a certain branch LSR. There is no need for routers along this common path to process the PATH message corresponding to the second branch LSP.

The same holds true for successive branch LSPs. The P2MP LSP ingress can send the PATH message directly to the branch LSR where the second branch LSP branches from the first one. The explicit route object (ERO) will contain hops along the path beyond the branch LSR. Furthermore a Label Request object is not inserted in such a PATH message. This mechanism is also referred to as non-adjacent signaling. This is done by sending the PATH message directly to the branch LSR. Hence while sending the PATH message for a particular branch LSP, the P2MP ingress can determine the first branch LSR where the path of this branch LSP, branches from the existing P2MP LSP. It can then use non-adjacent signaling to send the PATH message to the branch LSR. The branch LSR in turn, will send the RESV message directly to the ingress.

Hence with respect to FIG. 5, assume that SPE router 60 sets up branch LSP 80 to RPE router 66 first followed by branch LSP 82 to RPE router 68. In this case the PATH message for branch LSP 82 to RPE router 68, can be sent directly to router 64, bypassing router 62. This mechanism reduces PATH message processing and state along nodes that are on the common path of two or more branch LSPs.

When setting a P2MP LSP, a source router has a view of the entire network topology and can accordingly compute the path for each P2P LSP, sharing links where possible with other branch LSPs belonging to the P2MP LSP. This can also be described as a P2MP constrained shortest path first (CSPF), where a path to a destination router is set up as a P2P LSP.

Figure 6:
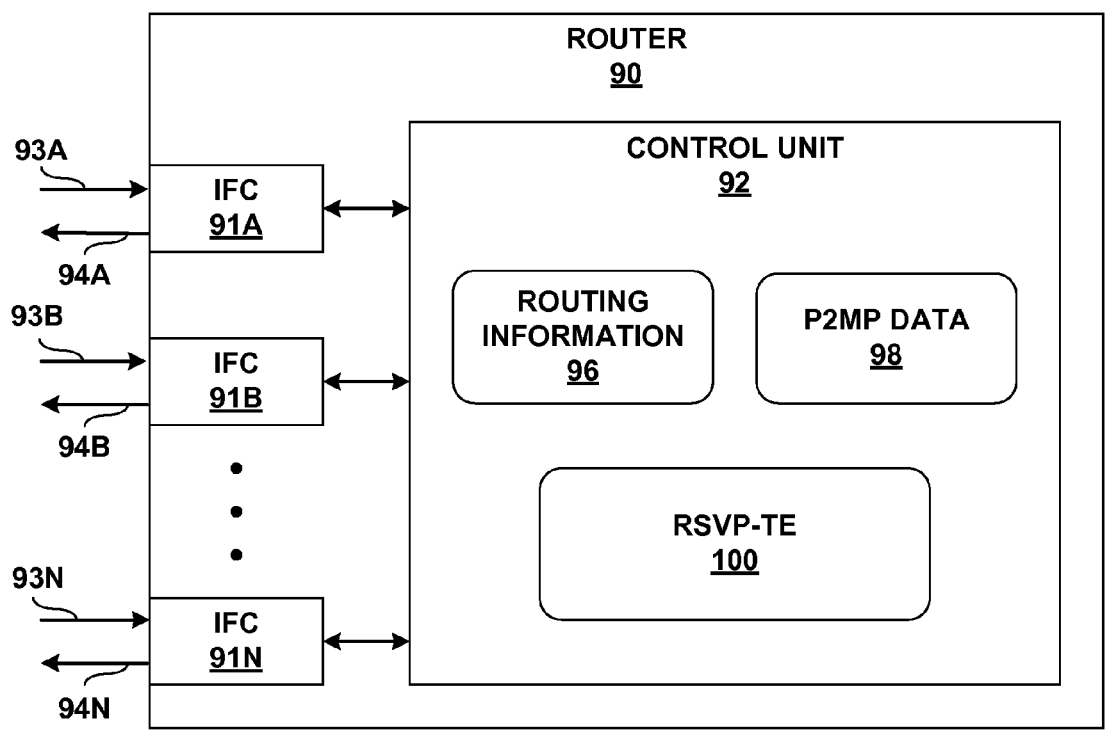
FIG. 6 is a block diagram illustrating an exemplary router that utilizes a protocol that has been extended as described herein.

FIG. 6 is a block diagram illustrating an exemplary router that utilizes a protocol that has been extended as described herein to reroute traffic associated with a P2MP LSP. Router 90 may, for example, represent any of the routers described herein. As an example, router 90 may comprise an ingress router associated with the P2MP LSP tunnel (i.e., a source network device), an egress router associated with the P2MP LSP tunnel (i.e., a destination network device) or an intermediate network device. In some embodiments, router 90 may be an intermediate network device associated with one or more branch LSPs of the P2MP LSP tunnel. Router 90 may, for example, operate as an ingress or egress for a bypass network tunnel associated with the branch LSPs.

In the example embodiment of FIG. 6, router 90 includes a set of interface cards (IFCs) 91A-91N ("IFCs 91") for communicating packets via inbound links 93A-93N ("inbound links 93") and outbound links 94A-94N ("outbound links 94"). Router 90 further comprises a control unit 92 that maintains routing information 96. Routing information 96 describes the topology of a network and, in particular, routes through the network. Routing information 96 may include, for example, route data that describes various routes within the network, and corresponding next hop data indicating appropriate neighboring devices within the network for each of the routes. Router 90 updates routing information 96 to accurately reflect the topology of the network. In general, when router 90 receives a packet via one of inbound links 93, control unit 92 determines a destination and associated next hop for the packet in accordance with routing information 96 and outputs the packet on one of outbound links 94 based on the destination.

In the example of FIG. 6, control unit 92 provides an operating environment for a resource reservation protocol 100 ("RSVP-TE protocol 100") executing within control unit 92. In other embodiments, other protocols may be executed within control unit 92, such as the label distribution protocol (LDP). RSVP-TE protocol 100 receives resource reservation requests from other routing devices, and reserves the requested bandwidth on outbound links 94 for RSVP-TE traffic. In the event traffic needs to be rerouted around a network failure or a congested link, for example, a system administrator or software agent invokes RSVP-TE protocol 100 to traffic engineer a new path through the network and establish the LSP. Although described for exemplary purposes in reference to RSVP-TE, the principles described herein may by applied to extend other protocols, such as different constraint-based routing protocols.

RSVP-TE protocol 100 has been extended to support P2MP LSPs and the reroute techniques described herein. Consistent with the principles of the invention, RSVP-TE protocol 100 provides signaling mechanisms for merging branch LSPs to form a P2MP LSP tunnel and for rerouting traffic associated with the P2MP LSP tunnel. In certain embodiments, the reroute operations may be carried out automatically, i.e., without intervention by a system administrator or a software agent.

RSVP-TE protocol 100 maintains P2MP data 98. Depending on the relation of router 90 to the P2MP LSP, P2MP data 98 may store one or more session identifiers, P2MP LSP identifiers and branch identifiers, as described above with respect to P2MP session objects 40 and RSVP-TE P2MP branch LSP sender template objects 50 of FIGS. 3 and 4. In addition, P2MP data 98 may store P2MP-IDs (PIDS) that can be used to map a set of destination network devices to a P2MP tree of branch LSPs for a particular application. As another example, P2MP data 98 may store one or more labels allocated for the branch LSPs.

The architecture of router 90 illustrated in FIG. 6 is shown for exemplary purposes only. The invention is not limited to this architecture. In other embodiments, router 90 may be configured in a variety of ways. In one embodiment, for example, control unit 92 and its corresponding functionality may be distributed within IFCs 91. In another embodiment, control unit 92 may include a routing engine that performs routing functions and maintains a routing information base (RIB), e.g., routing information 96, and a forwarding engine that performs packet forwarding based on a forwarding information base (FIB) generated in accordance with the RIB.

Control unit 92 may be implemented solely in software, or hardware, or may be implemented as a combination of software, hardware, or firmware. For example, control unit 92 may include one or more processors which execute software instructions. In that case, the various software modules of control unit 92, such as RSVP-TE protocol 100, may comprise executable instructions stored on a computer-readable medium, such as computer memory or hard disk.

Figure 7:
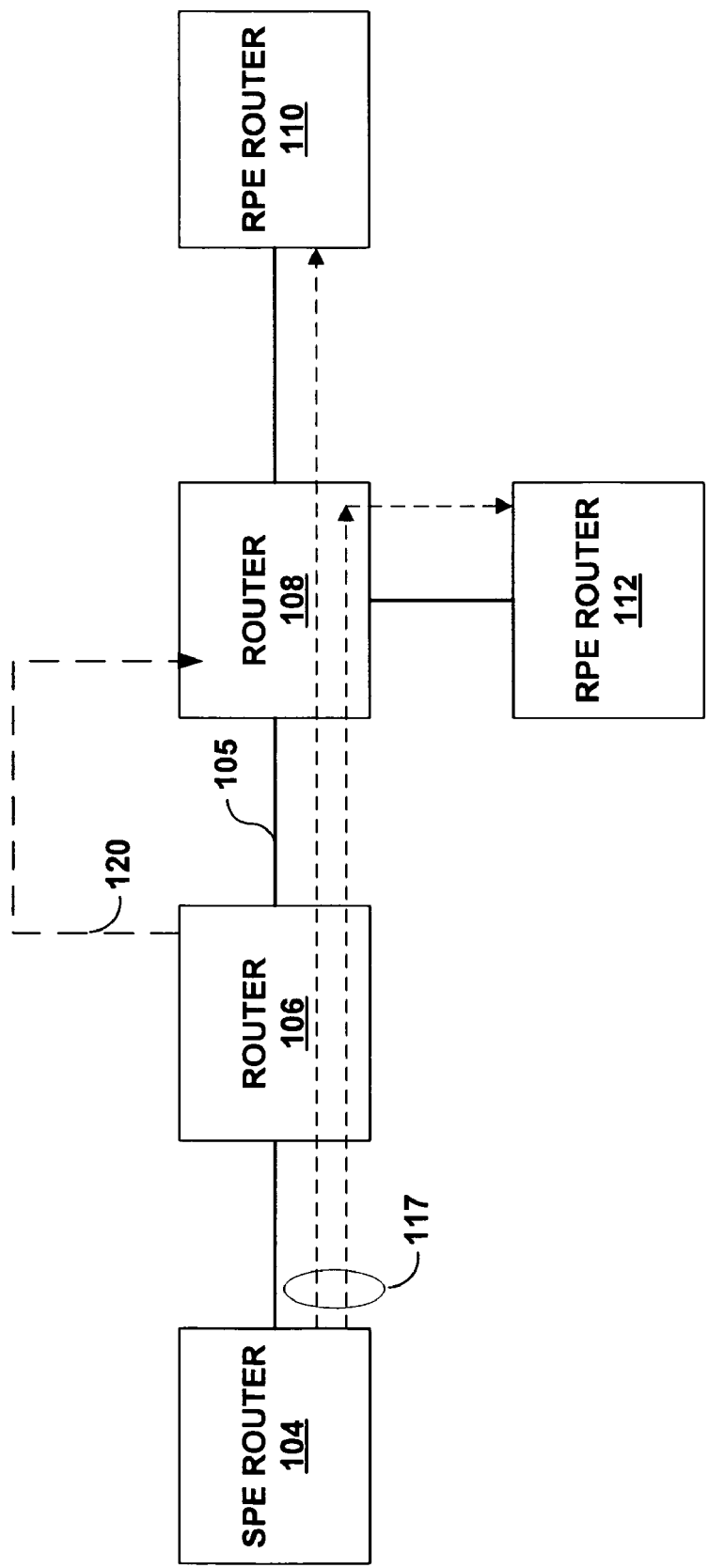
FIG. 7 is a block diagram illustrating an exemplary computer network in which a P2MP LSP includes a bypass tunnel.

FIG. 7 is a block diagram illustrating an exemplary computer network in which a P2MP LSP includes a bypass tunnel. In this example, SPE router 104 acts as a source network device for a P2MP LSP tunnel 117 having branch LSPs that flow through router 106, router 108, RPE router 112 and RPE router 110. P2MP LSP tunnel 117 is established to include two branch LSPs and a bypass tunnel 120 that provides protection from failure of link 105.

If link protection is desired, one or more bypass tunnels, such as bypass tunnel 120, may be used to protect the link between a "point of local repair" (PLR) (router 106) and a next-hop along the link (router 108). Thus, all branch LSPs that use a given link can be protected in the event of link failure by forwarding traffic associated with the branch LSPs through the bypass tunnel in the event of link failure. Note that all such branch LSPs belonging to a particular instance of a P2MP tunnel will share the same outgoing label on the link between the PLR and the next-hop. This is the P2MP LSP label on the link. Label stacking is used to send packets for each P2MP LSP in the bypass tunnel. The inner label is the P2MP LSP label allocated by the next hop. During failure, the PLR (router 106 in this example) sends PATH messages for each branch LSP that is effected to the "merge point" for the bypass tunnel (router 108 in this example). The PLR may use the sender template specific techniques described above to identify these PATH messages. Hence the PLR will set the branch LSP destination address to a local PLR address. The merge point for the bypass tunnel determines the protected branch LSP that match the specified identifier for the P2MP LSP (LSP-id) and the identifier for the particular branch LSP (branch-id).

Figure 8:
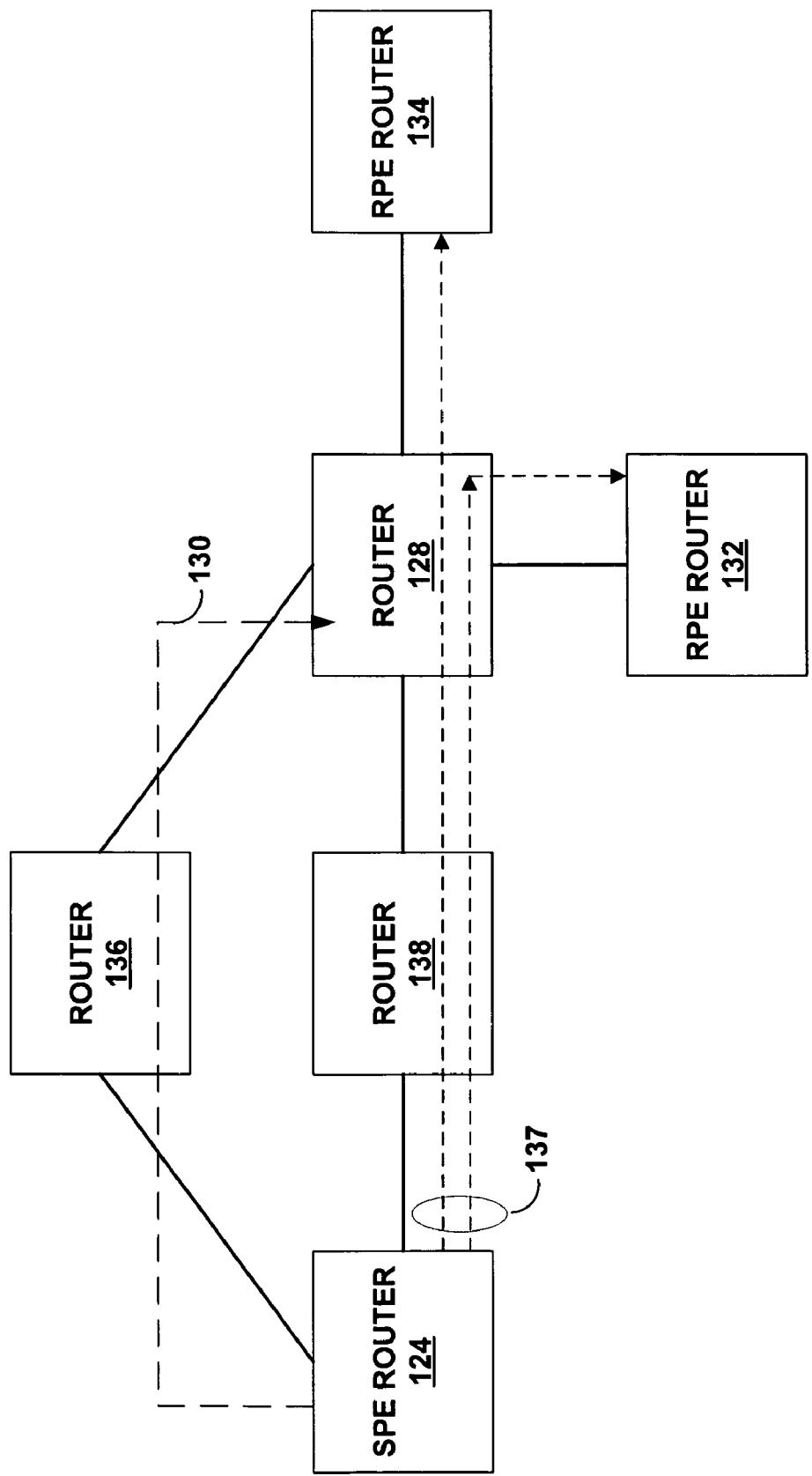
FIG. 8 is a block diagram illustrating another exemplary computer network in which a P2MP LSP includes a bypass tunnel.

FIG. 8 is a block diagram illustrating another exemplary computer network in which a P2MP LSP includes a bypass tunnel that provides node protection. In this example, SPE router 124 acts as a source network device for a P2MP LSP tunnel 137 having branch LSPs that flow through router 138, router 128, RPE router 132 and RPE router 134. P2MP LSP tunnel 137 is established to include two branch LSPs and a bypass tunnel 130 that provides protection from failure of router 138.

If node protection is desired, a bypass tunnel is established that bypasses the node to be protected (e.g., router 138 in this example). In particular, a first network device (router 124) is identified associated with a set of the LSP branches. A second network device (router 128) is selected that is downstream from the first network device and common to all of the LSP branches of the set of LSP branches flowing through the first network device. A bypass tunnel is established that originates at the first network device and terminates at the second network device. In the event a network event associated with at least one of the branch LSPs is detected (e.g., failure of router 138), traffic is rerouted to flow through the bypass tunnel in response to the detected network event.

In this manner, constraint information is used to select a merge point for the bypass tunnel intersects the path of the protected branch LSPs somewhere downstream of the PLR. This constrains the set of branch LSPs being backed-up via that bypass tunnel to those that pass through a common downstream merge point. The merge point will allocate the same label to all such branch LSPs belonging to a particular instance of a P2MP tunnel. This will be the inner label used during label stacking.

Figure 9:
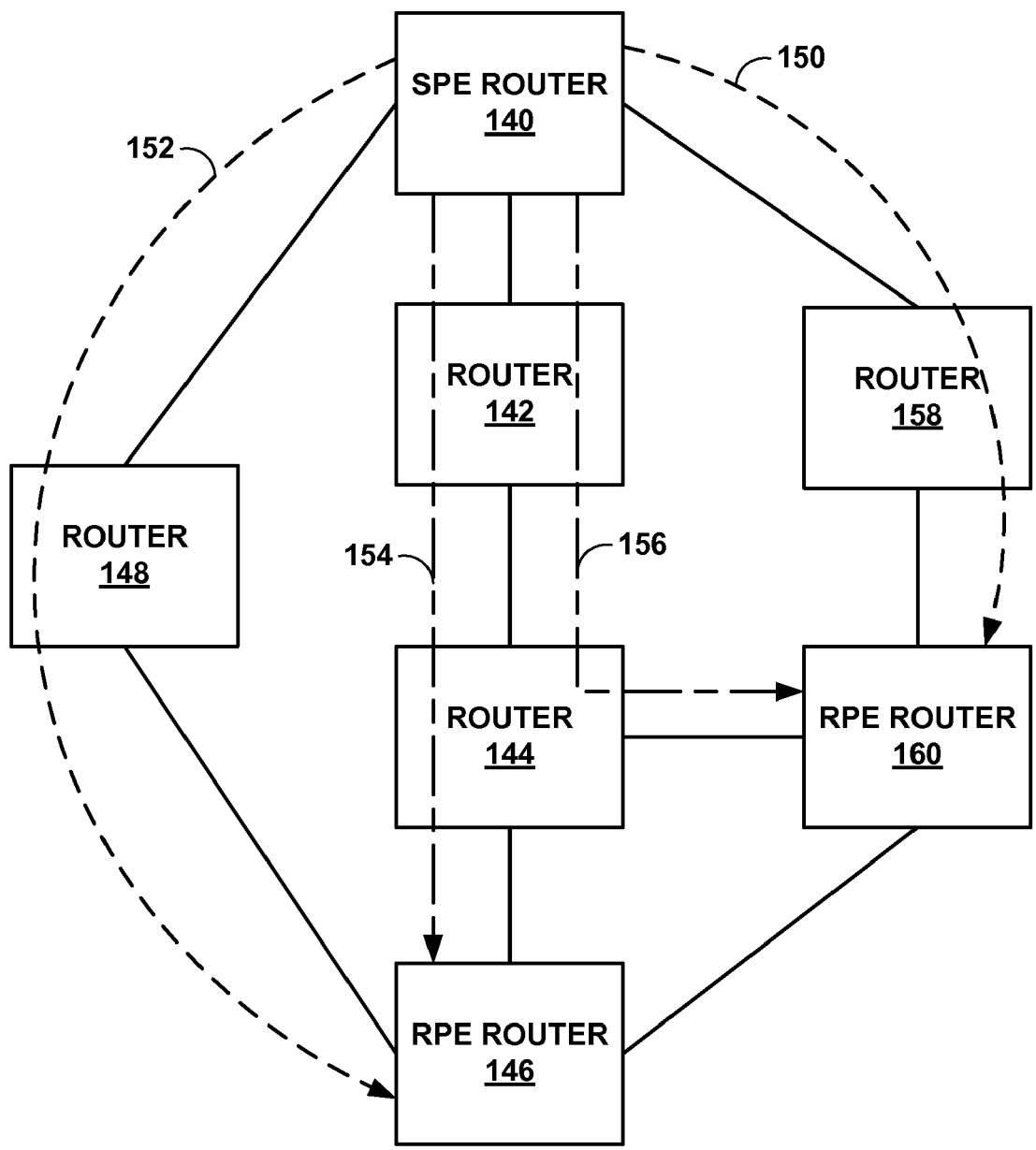
FIG. 9 is a block diagram of a network environment in which a first P2MP LSP and a second P2MP LSP have been established.

FIG. 9 is a block diagram of a network environment in which a first P2MP LSP has been established that includes branch LSPs 150 and 152. In addition, a second P2MP LSP has been defined that includes branch LSPs 154 and 156. In this example, SPE router 140 acts as a source network device for the first P2MP LSP having branch LSP 150 that flows through router 158 and RPE router 160, and branch LSP 152 that flows through router 148 and RPE router 146. SPE router 140 also acts as a source network device for the second P2MP LSP having branch LSP 154 that flows through router 142, router 144 and RPE router 146, and branch LSP 156 that flows through router 142, router 144 and RPE router 160. Moreover, branch LSPs 154, 156 of the second P2MP LSP are defined as detour branch LSPs. In particular, branch LSP 154 is a detour LSP for branch LSP 152 and branch LSP 156 is a detour LSP for branch LSP 150. In this manner, two P2MP LSP tunnels having a common source and destinations may be defined, wherein the second P2MP LSP tunnel includes detour branch LSPs, and each of the detour branch LSPs corresponds to a respective one of the branch LSPs for the first P2MP LSP tunnel.

In the event a network event associated with at least one of the LSP branches of the first P2MP LSP tunnel is detected, traffic is rerouted to flow through the detour branch LSP of the second P2MP LSP tunnel corresponding to the LSP branch of the first P2MP LSP tunnel for which the network event is detected.

This may be viewed as a form of one-to-one backup that can be used to protect a particular branch LSP against link and next-hop failure. Protection may be used for one or more branch LSPs between the PLR and the next-hop. All the branch LSPs corresponding to the same instance of the P2MP tunnel, between the PLR and the next-hop share the same P2MP LSP label. All or some of these branch LSPs may be protected. The detour branch LSPs may or may not share labels, depending on the detour path. Thus, the set of outgoing labels and next-hops for a P2MP LSP that was using a single next-hop and label between the PLR and next-hop before protection, may change once protection is triggered.

The path-specific method may be used be used to identify a backup branch LSP. Hence the DETOUR object will be inserted in the backup PATH message. A backup branch LSP should be treated as belonging to a different P2MP tunnel instance other than the one specified by the LSP-id (as illustrated in FIG. 9). Furthermore multiple backup branch LSPs should be treated as part of the same P2MP tunnel instance if they have the same LSP-id and the same DETOUR objects. Note that branch LSPs between different P2MP tunnel instances use different labels.

It is possible to take advantage of a LSP hierarchy [LSP-HIER] while building P2MP LSPs. One mechanism to do this is the use of P2P LSPs as links of the P2MP LSP. A P2P LSP can be advertised as a Forwarding Adjacency (FA) by the ingress of the P2P LSP. The FA can then be used by the headend of the P2MP LSP while computing the path of each branch LSP. If a FA is used by a branch LSP the corresponding ERO contains a list of objects up to the FA head-end followed by a loose object with the address of the FA tail-end. The FA head-end on receiving the branch LSP PATH message determines the FA from its Traffic Engineering Database (TED) and tunnels the PATH message over the FA. The FA tail-end on receiving the PATH message follows procedures specified in previous sections. The FA tail-end sends a RESV message to the FA head-end with a P2MP LSP label. The RESV message is sent using the procedures in [LSP-HIER].

Transit label-switched routers (LSRs) along a FA, being used by a P2MP LSP, typically do not process control plane messages associated with the P2MP LSP. In fact they are not aware of these messages as they are tunneled over the FA. This reduces the amount of control plane processing required on these transit LSRs. Hence the use of P2P LSPs as FAs can increase the overall control plane scalability while setting up P2MP LSPs.

It's conceivable that some LSRs, in a network deploying P2MP MPLS TE, may not be capable of P2MP MPLS. The use of FAs allows P2MP LSPs to be built in such an environment. As mentioned above, transit LSRs along a FA typically do not process control plane messages associated with a P2MP LSP. Furthermore these LSRs also do not need to have P2MP MPLS data plane capability as they only need to process MPLS data plane packets belonging to the P2P LSP that is being used as a FA. Hence these LSRs do not need to support P2MP MPLS. It is to be noted that such LSRs typically are unable to act as branch points along the P2MP LSP.

Various embodiments of the invention have been described. Although the embodiments have been described in terms of packet-based systems and methods, any network and application-layer profiling data may be correlated for other types of networks without departing from the principles of the invention. These and other embodiments are within the scope of the following claims.

The invention claimed is:

1. A method comprising:
    establishing, with a plurality of routing devices of a network, a point to multi-point (P2MP) label switched path (LSP) tunnel having a source and multiple destinations, wherein the P2MP LSP tunnel has a plurality of branch LSPs merged to form the P2MP LSP tunnel;
    establishing the P2MP LSP tunnel to include a bypass tunnel associated with at least one of the branch LSPs;
    receiving multicast traffic at the source of the P2MP LSP tunnel;
    forwarding copies of the multicast traffic from the source to each of the destinations via the P2MP LSP tunnel;
    forwarding at least a portion of the multicast traffic through the bypass tunnel;
    detecting a network event associated with at least one of the branch LSPs; and
    in response to the detected network event, rerouting the multicast traffic to flow through the bypass tunnel of the P2MP LSP, wherein rerouting the multicast traffic comprises:
        outputting one or more messages from an ingress node associated with the bypass tunnel to a merge point where the bypass tunnel merges with the at least one of the branch LSPs of the P2MP LSP, wherein the messages include an identifier for the P2MP LSP tunnel and an identifier for the branch LSP for which the network event is detected;
        receiving the messages at the merge point;
        determining the branch LSP for which the network event was detected based on the identifier for the P2MP LSP tunnel and the identifier for the LSP branch; and
        forwarding traffic to the multiple destinations based on the determination.

2. The method of claim 1, further comprising establishing the bypass tunnel to bypass a network link.

3. The method of claim 1, further comprising establishing the bypass tunnel to bypass a network device.

4. The method of claim 1, further comprising:
    identifying a first network device associated with a set of the LSP branches;
    selecting a second network device that is downstream from the first network device and common to all of the LSP branches of the set of LSP branches flowing through the first network device; and
    establishing the bypass tunnel to originate at the first network device and terminate at the second network device.

5. The method of claim 1, wherein establishing a P2MP LSP tunnel comprises executing a resource reservation protocol to establish the P2MP LSP tunnel.

6. The method of claim 1, further comprising establishing a second P2MP LSP tunnel from the source to the multiple destinations, wherein the P2MP LSP tunnel has a plurality of detour branch LSPs, wherein each of the detour branch LSPs corresponds to a respective one of the branch LSPs for the first P2MP LSP.

7. A system comprising:
    a source network device;
    a plurality of destination network devices; and
    a label switched path (LSP) tunnel from the source network device to the plurality of destination network devices, wherein the LSP tunnel has at least two branch LSPs merged to form the P2MP LSP tunnel and includes a bypass tunnel associated with at least one of the branch LSPs,
    an ingress network device associated with the bypass tunnel, wherein the ingress network device detects a network event associated with at least one of the branch LSPs, and reroutes traffic to flow through the bypass tunnel in response to the detected network event,
    wherein the ingress network device associated with the bypass tunnel is configured to output messages to a merge point where the bypass tunnel merges with the at least one of the branch LSPs of the P2MP LSP,
    wherein the messages include an identifier for the P2MP LSP tunnel and an identifier for the branch LSP for which the network event is detected, and
    wherein the merge point is configured to receive the messages, determine the branch LSP for which the network event was detected based on the identifier for the P2MP LSP tunnel and the identifier for the LSP branch; and forward traffic to the multiple destinations based on the determination.

8. The system of claim 7, wherein the bypass tunnel bypasses a network link associated with at least one of the branch LSPs.

9. The system of claim 7, wherein the bypass tunnel bypasses an intermediate network device associated with at least one of the branch LSPs.

10. The system of claim 7, wherein the bypass tunnel flows from a first network device associated with a set of the LSP branches to a second network device that is downstream from the first network device and common to all of the LSP branches of the set of LSP branches flowing through the first network device.

11. The system of claim 7, wherein the source network device outputs copies of multicast traffic to each of the destinations via the LSP tunnel, and at least a portion of the multicast traffic flows through the bypass tunnel.

12. The system of claim 7, wherein the source network device executes a resource reservation protocol to establish the LSP tunnel.

* * * * *

UNITED STATES PATENT AND TRADEMARK OFFICE
CERTIFICATE OF CORRECTION

PATENT NO.       : 7,602,702 B1                                         Page 1 of 1
APPLICATION NO.  : 11/056383
DATED            : October 13, 2009
INVENTOR(S)      : Rahul Aggarwal It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this

Fifth Day of October, 2010

David J. Kappos
*Director of the United States Patent and Trademark Office*